United States Patent
Matsumoto et al.

(10) Patent No.: US 8,941,716 B2
(45) Date of Patent: Jan. 27, 2015

(54) IMAGE CAPTURING APPARATUS CAPABLE OF CAPTURING A PANORAMIC IMAGE

(75) Inventors: Kosuke Matsumoto, Tokyo (JP); Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 359 days.

(21) Appl. No.: 13/240,902

(22) Filed: Sep. 22, 2011

(65) Prior Publication Data

US 2012/0075411 A1  Mar. 29, 2012

(30) Foreign Application Priority Data

Sep. 27, 2010 (JP) ................................ 2010-215467

(51) Int. Cl.
*H04N 7/00* (2011.01)
*G03B 37/00* (2006.01)
*H04N 5/232* (2006.01)

(52) U.S. Cl.
CPC ............ *G03B 37/00* (2013.01); *H04N 5/23238* (2013.01); *H04N 5/23248* (2013.01); *H04N 5/23261* (2013.01)
USPC ..................... 348/36; 348/37; 348/38; 348/39

(58) Field of Classification Search
CPC ........................................................ H04N 7/00
See application file for complete search history.

(56) References Cited

U.S. PATENT DOCUMENTS

2011/0234750 A1*  9/2011  Lai et al. .................... 348/37

FOREIGN PATENT DOCUMENTS

JP            6-303562 A       10/1994

* cited by examiner

*Primary Examiner* — Joseph Ustaris
*Assistant Examiner* — Maryam Nasri
(74) *Attorney, Agent, or Firm* — Holtz, Holtz, Goodman & Chick PC

(57) ABSTRACT

A digital camera 100 includes an image capturing unit 16, an angular velocity sensor 22, an image determination unit 53, and an image composition unit 52. The angular velocity sensor 22 acquires a displacement amount in a field of view of image data when the image data is captured at predetermined time intervals. The image determination unit 53 sets a determination criterion for determining whether the image data thus captured is to be combined or not based on the displacement amount in the field of view acquired by the angular velocity sensor 22. Also, the image determination unit 53 determines whether or not the image data thus captured is valid as a composition target based on the determination criterion thus set. The image composition unit 52 combines image data determined by the image determination unit 53 as being valid as a composition target.

7 Claims, 9 Drawing Sheets

IMAGE CAPTURING APPARATUS CAPABLE OF CAPTURING A PANORAMIC IMAGE

This application is based upon and claims the benefit of priority from Japanese Patent Application No. 2010-215467, filed Sep. 27, 2010, the entire contents of which are incorporated herein by reference.

BACKGROUND OF THE INVENTION

1. Field of the Invention

The present invention relates to an image capturing apparatus, an image composition method, and a storage medium, and more particularly to an image capturing apparatus, an image composition method, and a storage medium that stores a program, for capturing a panoramic image.

2. Related Art

Conventionally, there exist some digital cameras equipped with a function of capturing a panoramic image.

Japanese Patent Application Publication No. 1994-303562 discloses a technique of capturing a plurality of images while a user horizontally rotates a digital camera using his or her body as a rotation axis for a time period in which the user is continuously pressing down a shutter switch thereof and keeping the digital camera approximately fixed in a vertical direction. Furthermore, the above-mentioned patent document discloses generating image data of a panoramic image by combining data of a plurality of images acquired as a result of the above-mentioned image capturing processing, in a lateral (horizontal) direction.

SUMMARY OF THE INVENTION

It is an object of the present invention to improve the success rate in panoramic image capturing when capturing a panoramic image.

In order to attain the above-described object, in accordance with a first aspect of the present invention, there is provided image capturing apparatus, comprising: an image capturing unit; an acquiring unit that acquires an displacement amount in a field of view of image data when the image data is captured by the image capturing unit at predetermined time intervals; a determination criterion setting unit that sets a determination criterion for determining whether the image data thus captured is to be combined or not based on the displacement amount in the field of view acquired by the acquiring unit; an image determination unit that determines whether or not the image data thus captured is valid as a composition target based on the determination criterion set by the determination criterion setting unit; and an image composition unit that combines image data determined by the image determination unit as being valid as a composition target.

In order to attain the above-mentioned object, in accordance with a second aspect of the present invention, there is provided An image capturing method carried out by an image capturing apparatus equipped with an image capturing unit, the image capturing method comprising: an acquiring step of acquiring a displacement amount in a field of view of image data when the image data is captured by the image capturing unit at predetermined time intervals; a setting step of setting a determination criterion for determining whether the image data thus captured is to be combined or not based on the displacement amount in the field of view acquired in the acquiring step; an image determination step of determining whether or not the image data thus captured is valid as a composition target based on the determination criterion set in the criterion setting step; and an image composition control step of combining image data determined in the image determination step as being valid as a composition target.

In order to attain the above-described object, in accordance with a third aspect of the present invention, there is provided A storage medium of a computer in an image capturing apparatus provided with an image capturing unit, the storage medium being readable by the computer and having stored therein a program to make the computer function as: an acquiring unit that acquires a displacement amount in a field of view of image data when the image data is captured by the image capturing unit at predetermined time intervals; a determination criterion setting unit that sets a determination criterion for determining whether the image data thus captured is to be combined or not based on the displacement amount in the field of view acquired by the acquiring unit; an image determination unit that determines whether or not the image data thus captured is valid as a composition target based on the determination criterion set by the determination criterion setting unit, and an image composition unit that combines image data determined by the image determination unit as being valid as a composition target.

DETAILED DESCRIPTION OF THE INVENTION

The following describes an embodiment of the present invention with reference to the drawings.

Figure 1:
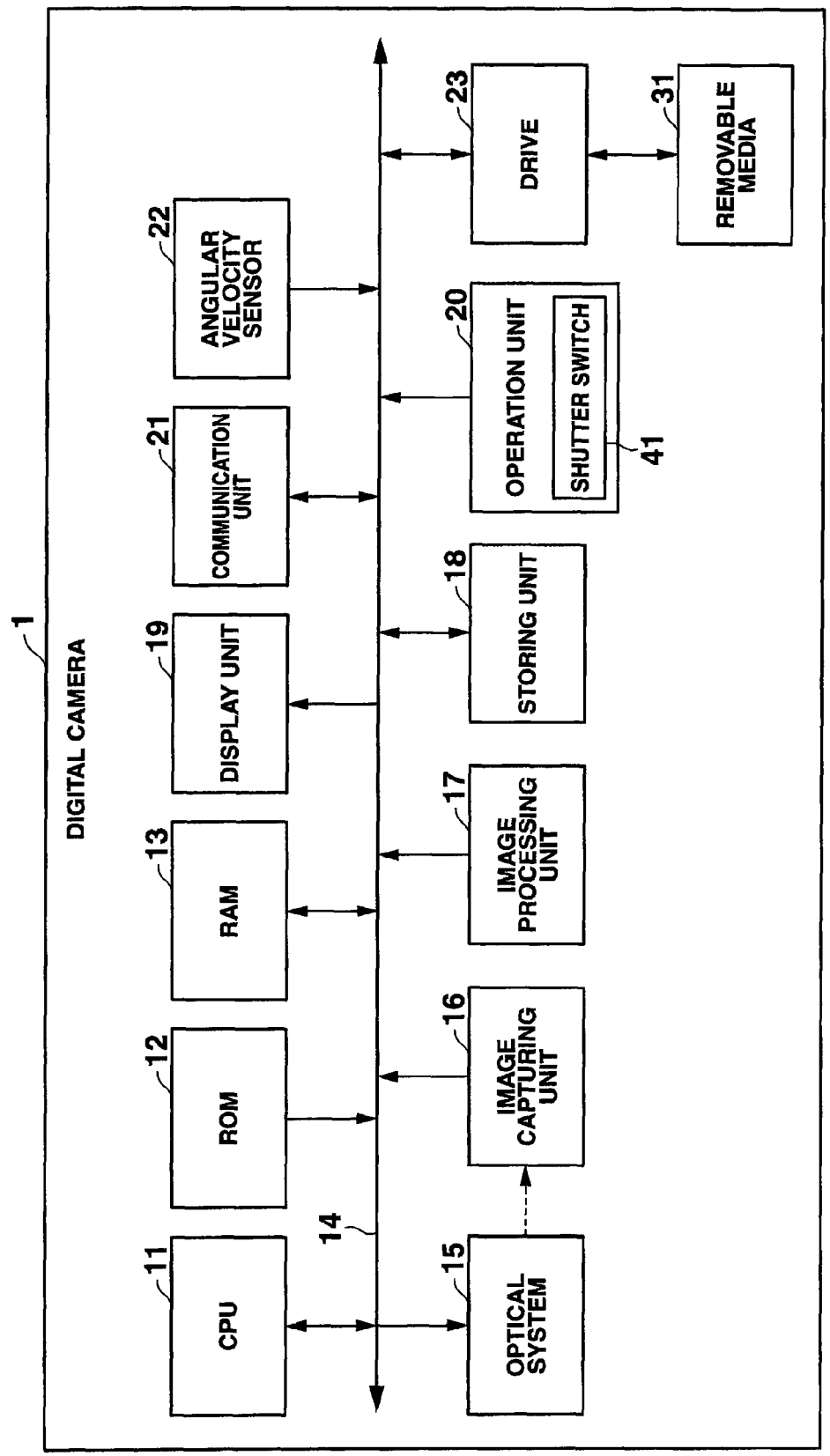
FIG. 1 is a block diagram showing a hardware configuration of a digital camera as one embodiment of an image capturing apparatus according to the present invention.

FIG. 1 is a block diagram showing a hardware configuration of a digital camera 1 as one embodiment of an image capturing apparatus according to the present invention.

The digital camera 1 is provided with a CPU (Central Processing Unit) 11, a ROM (Read Only Memory) 12, a RAM (Random Access Memory) 13, a bus 14, an optical system 15, an image capturing unit 16, an image processing unit 17, a storing unit 18, a display unit 19, an operation unit 20, a communication unit 21, an angular velocity sensor 22, and a drive 23.

The CPU 11 executes various processes according to programs that are stored in the ROM 12 or programs that are loaded from the storing unit 18 to the RAM 13.

The ROM 12 also stores data and the like, necessary for the CPU 11 to execute the various processes, as appropriate.

For example, according to the present embodiment, programs for implementing functions of an image capture control unit 51, an image composition unit 52, and an image determination unit 53 shown in FIG. 2, which will be described later, are stored in the ROM 12 or the storing unit 18. Therefore, each of the functions of the image capture control unit 51, the image composition unit 52, and the image determination unit 53 shown in FIG. 2, which will be described later, can be realized by the CPU 11 executing the processes according to these programs.

Incidentally, it is possible to transfer at least a part of each function of the image capture control unit 51, the image composition unit 52, and the image determination unit 53 shown in FIG. 2, which will be described later, to the image processing unit 17.

The CPU 11, the ROM 12, and the RAM 13 are connected to one another via the bus 14. The bus 14 is also connected with the optical system 15, the image capturing unit 16, the image processing unit 17, the storing unit 18, the display unit 19, the operation unit 20, the communication unit 21, the angular velocity sensor 22, and the drive 23.

The optical system 15 is configured by a light condensing lens such as a focus lens, a zoom lens, and the like, for example, to photograph a subject. The focus lens is a lens for forming an image of a subject on the light receiving surface of the image sensor of the image capturing unit 16. The zoom lens is a lens for freely changing a focal point within a predetermined range. The optical system 15 also includes peripheral circuits to adjust focus, exposure, and the like, as necessary.

The image capturing unit 16 is configured by an optoelectronic conversion device, an AFE (Analog Front End), and the like. The optoelectronic conversion device is configured by a CCD (Charge Coupled Device) type or a CMOS (Complementary Metal Oxide Semiconductor) type of optoelectronic conversion device, for example. The optoelectronic conversion device optoelectronically converts (i.e. captures), at a predetermined interval, a light signal of an image of a subject, which has been incident on and accumulated during the interval, and sequentially supplies the resultant analog signal to the AFE.

The AFE executes various kinds of signal processing such as A/D (Analog/Digital) conversion of the analog signal and outputs the resultant digital signal as an output signal from the image capturing unit 16.

Hereinafter, the output signal from the image capturing unit 16 is referred to as "image data of a captured image". Thus, image data of a captured image is outputted from the image capturing unit 16 and provided as appropriate to the image processing unit 17 and the like.

The image processing unit 17 is configured by a DSP (Digital Signal Processor), a VRAM (Video Random Access Memory), and the like.

The image processing unit 17 collaborates with the CPU 11 to execute various kinds of image processing such as noise reduction, white balance, anti-shaking, and the like.

Hereinafter, image data of each captured image provided from the image capturing unit 16 at a predetermined interval is referred to as "image data of a frame". In the present embodiment, the frame is employed as a unit of processing. The image processing unit 17 carries out various kinds of image processing on the image data of the frame provided from the image capturing unit 16 and outputs the resultant image data.

The storing unit 18 is configured by a DRAM (Dynamic Random Access Memory) or the like and temporarily stores image data of a frame outputted from the image processing unit 17, image data of a panoramic image in progress, which will be described later, and the like. Also, the storing unit 18 stores various kinds of data necessary for various kinds of image processing.

The display unit 19 is configured as a flat display panel, for example, which includes an LCD (Liquid Crystal Device), an LCD driving unit, and the like. The display unit 19 displays an image expressed by image data provided from the storing unit 18 or the like, e.g., each frame of the live-view image, which will be described later.

The operation unit 20 includes a plurality of switches, as well as a shutter switch 41, such as a power switch, an image capture mode switch, and a playback switch, which are not shown. When one of the plurality of switches is pressed down, the operation unit 20 provides to the CPU 11 an instruction assigned to the switch.

The communication unit 21 controls communication with other devices (not shown) via a network including the Internet.

The angular velocity sensor 22 includes a gyro and the like, detects angular displacement of the digital camera 1, and provides to the CPU 11 the digital signal (hereinafter, referred to simply as "angular displacement") indicating the detection result. Here, the angular velocity sensor 22 is assumed to have a function of detecting the direction of the geomagnetic field and, as needed, to implement a function of a direction sensor.

Removable media 31 such as a magnetic disk, an optical disk, a magneto-optical disk, or a semiconductor memory is mounted to the drive 23, as appropriate. Also, programs read from the removable media 31 are installed in the storing unit 18 as necessary. Furthermore, similar to the storing unit 18, the removable media 31 can store various kinds of data such as image data and the like, stored in the storing unit 18.

Figure 2:
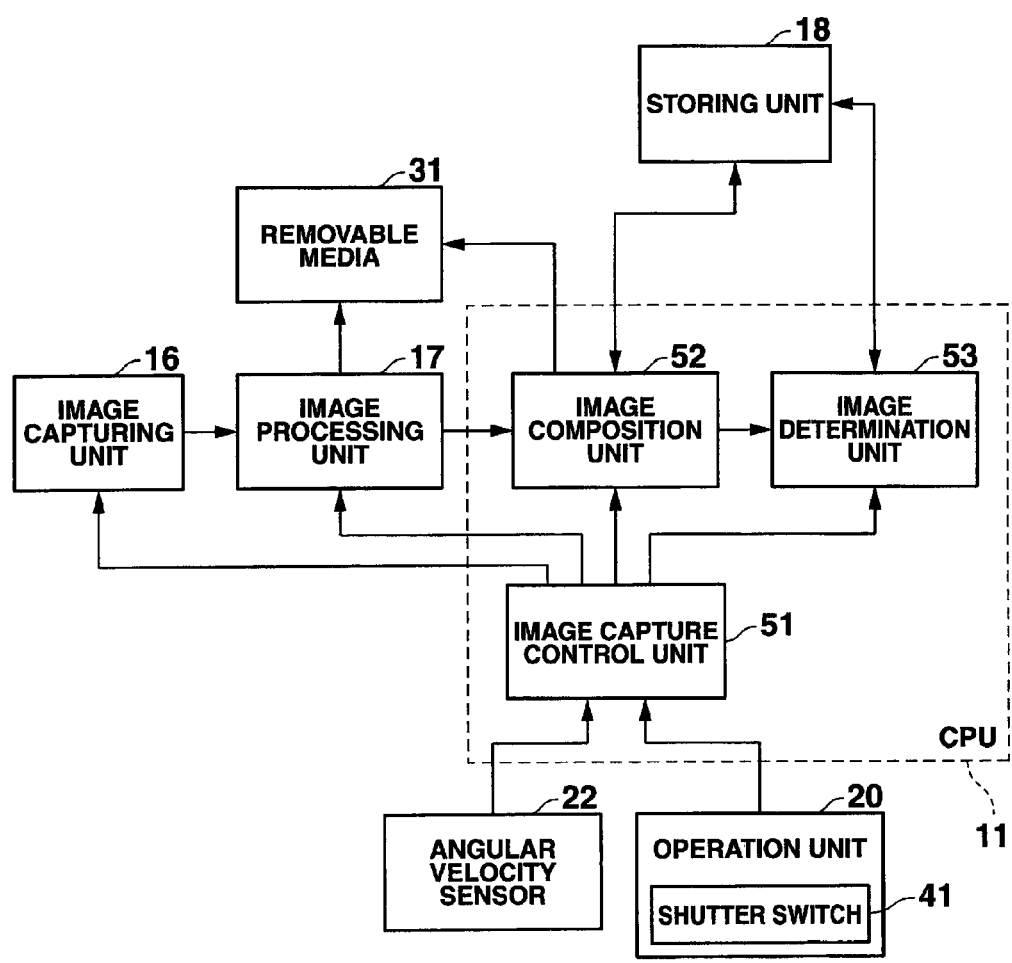
FIG. 2 is a functional block diagram showing a functional configuration of the digital camera shown in FIG. 1 to carry out image capture processing.

FIG. 2 is a functional block diagram showing a functional configuration to carry out a series of processing (hereinafter, referred to as "image capture processing") of capturing an image of a subject and storing the resultant image data of the captured image in the removable media 31 from the processing carried out by the digital camera 1 shown in FIG. 1.

As shown in FIG. 2, the CPU 11 is provided with an image capture control unit 51, an image composition unit 52, and an image determination unit 53.

Incidentally, as described above, each function of the image capture control unit 51, the image composition unit 52, and the image determination unit 53 need not necessarily be installed in the CPU 11, and it is possible to transfer at least a part thereof to the image processing unit 17.

The image capture control unit 51 controls overall execution of the image capture processing. For example, the image capture control unit 51 can selectively switch the operation mode of the digital camera 1 between a normal image capture mode and a panoramic image capture mode and execute the processing according to the operation mode after switching.

In the panoramic image capture mode, the image composition unit 52 and the image determination unit 53 operate under control of the image capture control unit 51.

Here, for ease of understanding the image capture control unit 51, the image composition unit 52, and the image determination unit 53, before describing the functional configuration thereof, a detailed description will be given concerning the panoramic image capture mode with reference to FIGS. 3 and 4 as appropriate.

FIG. 3 is a diagram illustrating image capture operations in cases in which the normal image capture mode and the panoramic image capture mode are respectively selected as operation modes of the digital camera 1 shown in FIG. 1.

Figure 3A:
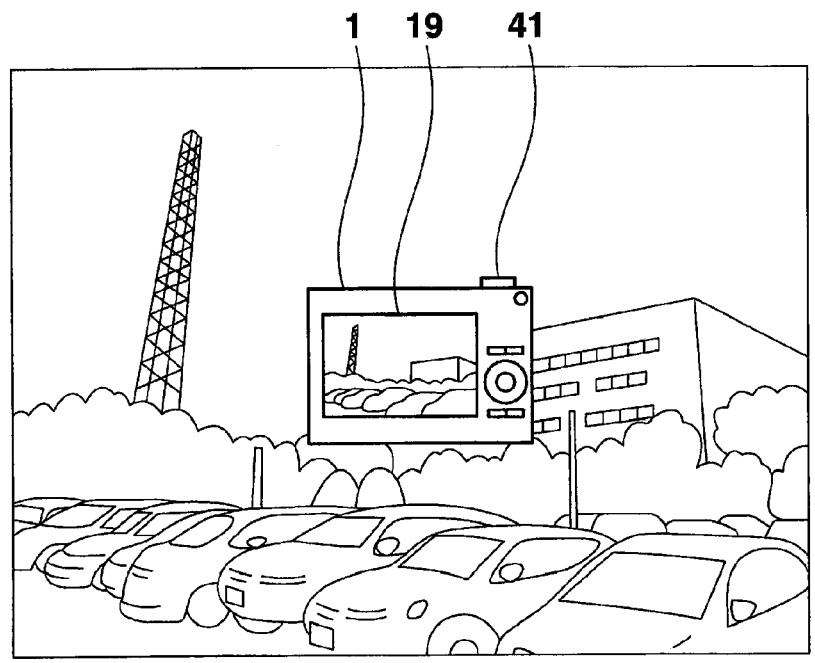
FIG. 3 is a diagram illustrating image capture operations in cases in which a normal image capture mode and a panoramic image capture mode are respectively selected as operation modes of the digital camera shown in FIG. 2.
Figure 3B:
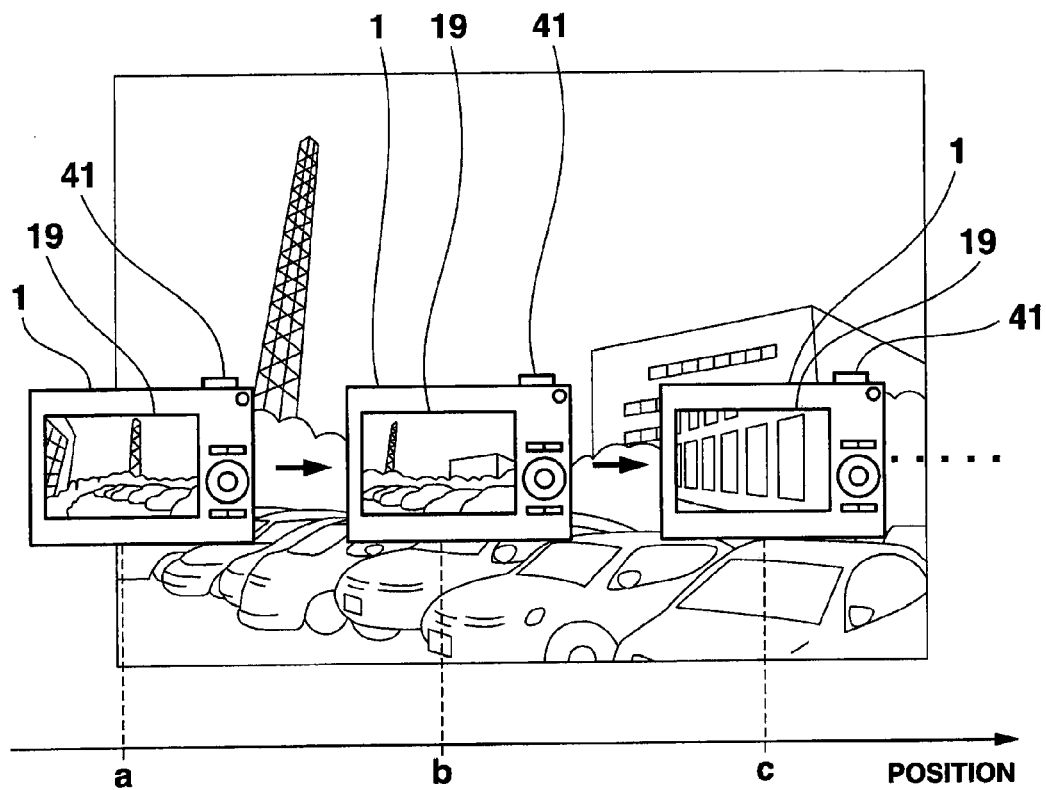

More specifically, FIG. 3A is a diagram illustrating the image capture operation in the normal image capture mode. FIG. 3B is a diagram illustrating the image capture operation in the panoramic image capture mode.

In each of FIGS. 3A and 3B, the picture in the digital camera 1 shows a real world view including the photograph subject of the digital camera 1. The vertical dotted lines shown in FIG. 3B indicate positions a, b, and c in the moving direction of the digital camera 1. Here, the moving direction of the digital camera 1 is intended to mean a direction in which an optical axis of the digital camera 1 moves when the user pivots about his/her own body as an axis to change the shooting direction (angle) of the digital camera 1.

The normal image capture mode is intended to mean an operation mode in which an image of a size (resolution) corresponding to the field of view of the digital camera 1 is captured.

In the normal image capture mode, as shown in FIG. 3A, the user presses the shutter switch 41 of the operation unit 20 all the way down while fixedly holding the digital camera 1. Hereinafter, such an operation of pressing the shutter switch 41 all the way down is referred to as a "full press operation" or simply "full press".

The image capture control unit 51 controls execution of a series of processes up to a process of storing, in the removable media 31 as a recording target, the image data of a frame outputted from the image processing unit 17 immediately after the user's full press operation.

Hereinafter, such a series of processes carried out under control of the image capture control unit 51 in the normal image capture mode is referred to as "normal image capture processing".

On the other hand, the panoramic image capture mode is intended to mean an operation mode in which a panoramic image is captured.

In the panoramic image capture mode, as shown in FIG. 3B, the user moves the digital camera 1 in the direction of black arrows shown therein, while continuing the full press operation of the shutter switch 41.

While the full press operation is continued, the image capture control unit 51 controls the image composition unit 52 and the like to repeat temporarily storing, in the storing unit 18, image data of a frame outputted from the image processing unit 17 immediately after each time angular displacement cumulatively provided from the angular velocity sensor 22 reaches a constant value. Here, the angular displacement detected by the angular velocity sensor 22 corresponds to a displacement amount in the field of view of image data each time the image data is captured by the image capturing unit 16 at predetermined time intervals. The angular velocity sensor 22 acquires a displacement amount in field of view of image data each time the image data is captured by the image capturing unit 16 at predetermined time intervals.

After that, the user gives an instruction for termination of the panoramic image capturing by an operation of releasing the full press operation (hereinafter, referred to as "release operation"), i.e., moving a finger or the like away from the shutter switch 41.

When instructed to terminate the panoramic image capturing, the image capture control unit 51 generates image data of a panoramic image by horizontally combining image data of the plurality of frames so far stored in the storing unit 18 in the stored order.

The image capture control unit 51 controls the image composition unit 52 and the like to store the image data of the panoramic image in the removable media 31 as a recording target.

Thus, in the panoramic image capture mode, the image capture control unit 51 controls the image composition unit 52 and the like and controls a series of processing from generating image data of a panoramic image up to storing it in the removable media 31 as a recording target.

Hereinafter, such a series of processing in the panoramic image capture mode carried out under control of the image capture control unit 51 is referred to as "panoramic image capture processing".

More specifically, under control of the image capture control unit 51, the image composition unit 52 carries out processing as follows:

Each time the digital camera 1 moves by a predetermined amount (each time the cumulative value of the angular displacement thereof reaches a constant value), the image composition unit 52 receives an acquisition instruction issued from the image capture control unit 51, acquires image data of one frame from the image processing unit 17, and stores it in the storing unit 18.

When the image capture control unit 51 gives an instruction to terminate panoramic image capturing, the image composition unit 52 generates image data of a panoramic image by horizontally combining image data of the plurality of frames so far stored in the storing unit 18 in the stored order.

Figure 4:
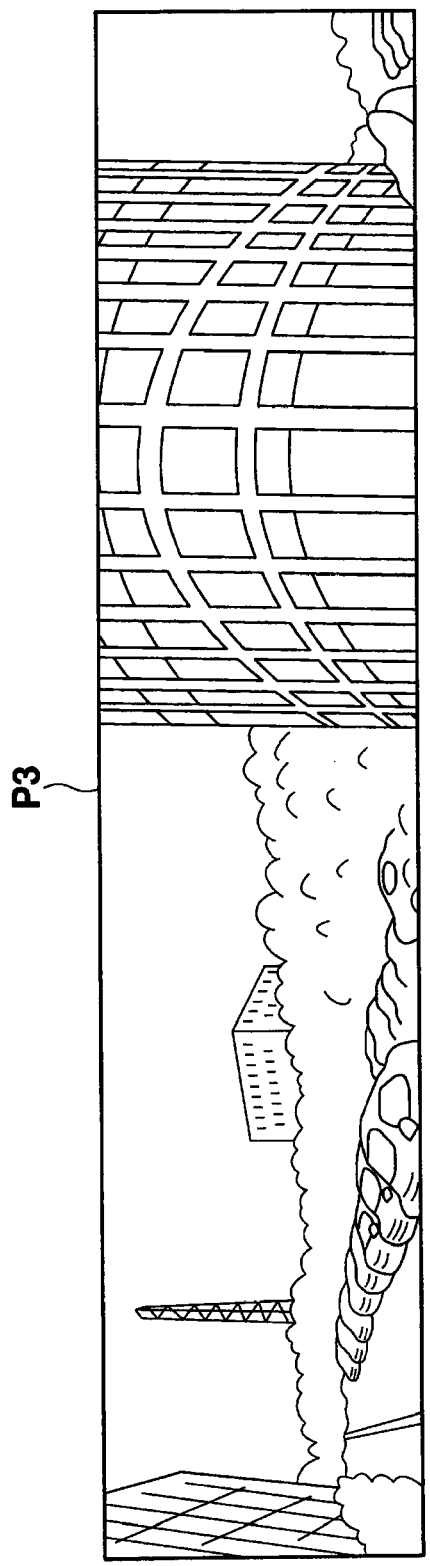
FIG. 4 is a diagram illustrating one example of a panoramic image generated in the panoramic image capture mode shown in FIG. 3.

FIG. 4 is a diagram illustrating one example of a panoramic image generated by the image composition unit 52 in the panoramic image capture mode shown in FIG. 3.

In the panoramic image capture mode, when an image capture operation as shown in FIG. 3B is performed, under control of the image capture control unit 51, the image composition unit 52 generates image data of a panoramic image P3 such as shown in FIG. 4 and stores it in the removable media 31.

Here, the image data of the panoramic image P3 of FIG. 4 is ideal data, which can be acquired only when the digital camera 1 is kept fixed in a vertical direction.

In practice, however, it is difficult to keep the digital camera 1 fixed in a vertical direction. Especially as the captured image range becomes wider, it tends to become more difficult to keep the digital camera 1 fixed in a vertical direction. In the following, this problem will be more specifically described with reference to FIG. 5.

Figure 5:
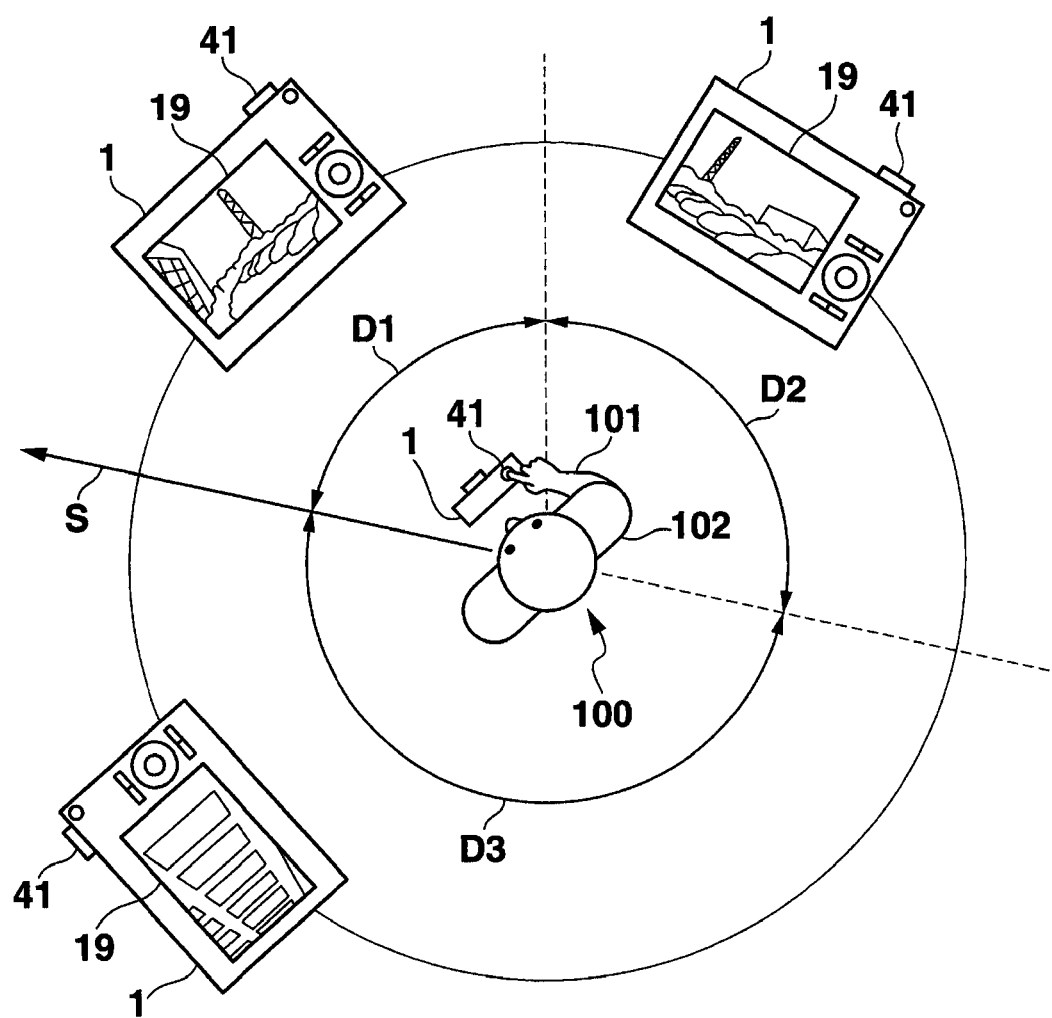
FIG. 5 is a top view showing a user's image capture operation in the case in which panoramic image capture mode is selected.

FIG. 5 is a top view showing a user's operation of image capturing in a case in which the panoramic image capture mode is selected.

The user 100 starts panoramic image capturing by performing a full press operation on the shutter switch 41 in a state in which the digital camera 1 is held with the right arm 101, as shown in FIG. 5, for example.

Here, it is assumed that the direction of the optical axis of the digital camera 1 at the start of panoramic image capturing is the direction of the solid arrow S shown in FIG. 5.

In this case, as panoramic image capturing starts, the user 100 pivots about his/her own body 102 as an axis and rotates the digital camera 1 clockwise, for example, in a horizontal direction (parallel to the plane of paper of FIG. 5) from the starting point, where the optical axis direction of the digital camera 1 coincides with the direction of the arrow S.

Here, while the digital camera 1 rotates horizontally, if the digital camera 1 is kept fixed in a vertical direction (perpendicular to the plane of paper of FIG. 5), it is possible to acquire ideal data such as the image data of the panoramic image P3 of FIG. 4.

In practice, however, it is difficult for the user 100 to keep the digital camera 1 fixed in a vertical direction. As the captured image range expands, viz., as a rotation angle of the digital camera 1 increases, it becomes more difficult to keep the digital camera 1 fixed in a vertical direction.

Here, as an index, a total angular displacement θ is introduced to indicate the current rotation angle of the digital camera 1 during panoramic image capturing.

The total angular displacement θ is intended to mean an angle θ between the direction of the arrow S (the direction of the optical axis of the digital camera 1 at the start of panoramic image capturing) and the current direction of the optical axis of the digital camera 1, in FIG. 5, assuming that the rotation center of the body 102 is coincident with the rotation center of the digital camera 1. In the present embodiment, a cumulative value of the angular displacement cumulatively provided from the angular velocity sensor 22 from the start up to the current point in time is employed as the total angular displacement θ, as will be described as the process of step S38 of FIG. 8.

For a while after the start of panoramic image capturing, the total angular displacement θ of the digital camera 1 remains within the range D1.

In this way, during a period when the total angular displacement θ of the digital camera 1 remains within the range D1, the user 100 can rotate the digital camera 1 clockwise in a horizontal direction by moving only the right arm 101 that is holding the digital camera 1, without shaking his or her body 102.

As a result, the vertical position of the digital camera 1 is maintained approximately unchanged while the total angular displacement θ of the digital camera 1 remains within the range D1.

After that, however, as the digital camera 1 is rotated farther clockwise in a horizontal direction, the total angular displacement θ of the digital camera 1 comes to fall within the range D2.

Once the total angular displacement θ of the digital camera 1 comes within the range D2, it becomes necessary for the user 100 to twist his or her body 102 to farther rotate the digital camera 1 clockwise in a horizontal direction.

As will be understood from the foregoing description, after the total angular displacement θ of the digital camera 1 comes to fall within the range D2, since the user 100 is required to twist his or her body 102, the right arm 101 that is holding the digital camera 1 gradually lowers.

As a result, while the total angular displacement θ of the digital camera 1 is within the range D2, the vertical position of the digital camera 1 tends to be lowered.

As the digital camera 1 is rotated still farther clockwise in a horizontal direction, the total angular displacement θ of the digital camera 1 comes to fall within the range D3.

Once the total angular displacement θ of the digital camera 1 falls within the range D3, it becomes necessary for the user 100 to turn the entire body 102 to farther rotate the digital camera 1 clockwise in a horizontal direction.

As will be understood from the foregoing description, after the total angular displacement θ of the digital camera 1 comes to fall within the range D3, since the user 100 turns the entire body 102, the entire body 102 sways up and down.

As a result, while the total angular displacement θ of the digital camera 1 is within the range D3, the vertical position of the digital camera 1 tends to sway up and down.

For the sake of convenience in the description, only the case in which the digital camera 1 is rotated clockwise in a horizontal rotation has been described. However, for a case in which the digital camera 1 is rotated counterclockwise, a similar description can be given.

Figure 6:
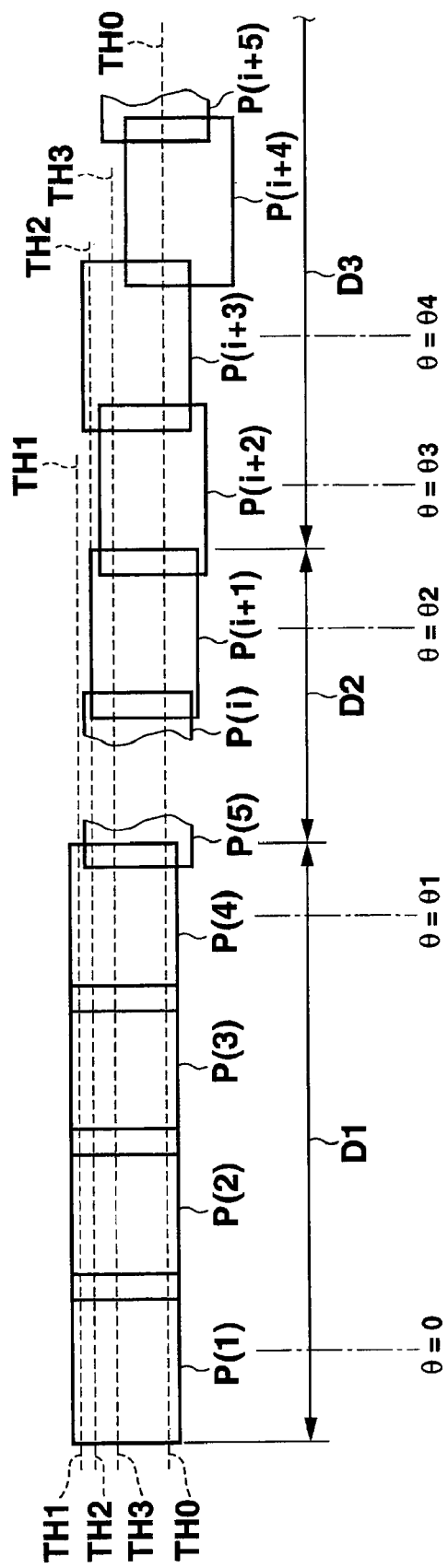
FIG. 6 is a diagram illustrating frames respectively corresponding to pieces of image data cumulatively stored in the digital camera of FIG. 2 while a panoramic image is captured by a user's operation shown in FIG. 5.

FIG. 6 is a diagram illustrating frames corresponding to respective items of image data outputted from the image capturing unit 16 and cumulatively stored in the storing unit 18 while the total angular displacement θ of the digital camera 1 is changing from the ranges D1 to D3 shown in FIG. 5 during panoramic image capturing.

In FIG. 6, the frame P(k) indicates the frame corresponding to the image data stored in the storing unit 18 for the k-th time after panoramic image capturing has started.

The horizontal axis indicates the total angular displacement θ of the digital camera 1, and the vertical axis indicates the vertical position of the digital camera 1. Descriptions of the vertical positions TH0 to TH3 will be given later.

Here, a 2-dimensional image acquired by capturing an image of the 3-dimensional space denotes the frame P(k).

Hereinafter, the vertical position of a 3-dimensional space captured in the frame P(k) is referred to as "vertical position of the frame P(k)".

If the vertical position of the frame P(k) is high, objects and the like at a high position in the 3-dimensional space are included as images thereof. On the other hand, if the vertical position of the frame P(k) is low, objects and the like at a low position in the 3-dimensional space are included as images thereof.

The frames P(1) to P(4) are captured when the total angular displacement θ is within the range D1.

In the range D1, since the vertical position of the digital camera 1 tends to stay flat, as described above, the vertical positions of the frames P(1) to P(4) are also approximately flat, as shown in FIG. 6.

The frames P(5) to P(i+1) are captured when the total angular displacement θ is within the range D2.

In the range D2, since the vertical position of the digital camera 1 tends to slope downwards, as described above, the vertical positions of the frames P(5) to P(i+1) also slope downwards, as shown in FIG. 6.

The frames P(i+2) and after are captured when the total angular displacement θ is within the range D3.

In the range D3, since the vertical position of the digital camera 1 tends to sway up and down, as described above, the vertical positions of the frames P(i+2) and after also sway up and down, as shown in FIG. 6.

Thus, even within one sequence of panoramic image capturing, the tendency of the fluctuation of the vertical position of the frame P(k) varies depending on the total angular displacement θ of the digital camera 1.

For this reason, at the execution of processing of determining whether or not the image data of the frame sequentially acquired by panoramic image capturing is valid, the image determination unit 53 of FIG. 2 varies the determination criterion for such determination according to the current position (total angular displacement θ) of the digital camera 1.

Here, "image data of the frame P(k) is valid" is intended to mean that it is possible for the image data of the frame P(k) to maintain continuity as image data of a panoramic image if image data of the frames P(1) to P(k−1) acquired up until the previous time and the image data of the current frame P(k) as a determination target is horizontally combined in this order.

Here, as the method of determining whether or not the image data of the frame P(k) is valid, in the present embodiment, a method of determining whether or not a predetermined position in a vertical direction of the frame P(k) is within a standard range is employed.

Such a standard range in a vertical direction is employed as one example of a determination criterion, which varies in accordance with the current position (total angular displacement θ) of the digital camera 1 in the present embodiment.

Hereinafter, such a series of processing is referred to as "image determination processing".

The image determination processing itself has been executed conventionally. However, the determination criterion has been fixed and the current position (total angular displacement θ) of the digital camera 1 has not been considered.

Taking the example of FIG. 6, conventionally an uppermost reference position TH1 and a lowermost reference position TH0 have been uniformly fixed as determination criteria in a vertical direction.

Conventionally, such determination criteria have been uniformly fixed, and the image data of the frame P(k) is determined to be valid if the top position (e.g., the first line position in a vertical direction) of the frame P(k) is higher than the uppermost reference position TH1 and the bottom position (e.g., the last line position in a vertical direction) of the frame P(k) is lower than the lowermost reference position TH0, for example.

In such a case, when the total angular displacement θ of the digital camera 1 comes within the range D2 and, for example, image data of the frame P(5) is acquired, the image data of the frame P(5) will be determined to be invalid. As a result, panoramic image capturing ends up being forcibly aborted as an image capture failure error due to discontinuity of the panoramic image.

This means that if the total angular displacement θ of the digital camera 1 comes within the range D2, vertical fluctuation increases due to human body characteristics.

Accordingly, image capture failure error increases, and panoramic image capturing is forcibly aborted more frequently.

Thus, the success rate of panoramic image capturing decreases.

For this reason, in the present embodiment the image determination unit 53 changes the determination criterion in accordance with the total angular displacement θ of the digital camera 1 in order to prevent image capture failure error due to vertical fluctuation inevitably caused by the human body characteristics.

For example, in FIG. 6, when the total angular displacement θ of the digital camera 1 is within the range D1, the image determination unit 53 employs conventional determination criteria employing the uppermost reference position TH1 and the lowermost reference position TH0.

On the other hand, when the total angular displacement θ of the digital camera 1 is within the range D2, the image determination unit 53 changes the uppermost reference position from the position TH1 that has been employed in the range D1 to the position TH2. Incidentally, as the lowermost reference position, the position TH0 in the range D1 may be continuously employed, or another position may be employed.

With this, in the range D2, image data of the frames P(5) to P(i+1), which tend to slope downward due to human body characteristics, are determined to be valid. As a result, even when the total angular displacement θ of the digital camera 1 is within the range D2, panoramic image capturing being forcibly aborted due to image capture failure error becomes less frequent, and continuous panoramic image capturing becomes possible.

Furthermore, when the total angular displacement θ of the digital camera 1 is within the range D3, the image determination unit 53 changes the uppermost reference position from the position TH2 that has been employed in the range D2 to the position TH3. Also, the image determination unit 53 changes the lowermost reference position in an upward direction, which is not shown.

With this, in the range D3, image data of the frames P(i+2) and after, which tend to sway up and down due to human body characteristics, are determined to be valid. As a result, even when the total angular displacement θ of the digital camera 1 is within the range D3, panoramic image capturing being forcibly aborted due to image capture failure error becomes less frequent, and continuous panoramic image capturing becomes possible.

This means that the image determination unit 53 estimates the state of an image capture operation of the user 100 in accordance with the total angular displacement θ of the digital camera 1 and, based on the estimation result, changes determination criterion.

When the total angular displacement θ of the digital camera 1 is within the range D1, the image determination unit 53 estimates that the state of an image capture operation of the user 100 is normal and, based on the estimation result, employs a conventional determination criterion as described above.

On the other hand, when the total angular displacement θ of the digital camera 1 is within the range D2, the image determination unit 53 estimates that the state of image capture operation of the user 100 is a state in which the right arm 101 is being lowered and, based on the estimation result, changes the determination criterion as described above.

Furthermore, when the total angular displacement θ of the digital camera 1 is within the range D3, the image determination unit 53 estimates that the state of image capture operation of the user 100 is a state in which the body 102 is swaying up and down and, based on the estimation result, changes to the determination criterion as described above. The image determination unit 53 also sets a determination criterion for determining whether the captured image data is to be combined or not based on the displacement amount in the field of view acquired by the angular velocity sensor 22.

The method of changing the determination criterion is not limited to the example described above and any method is applicable thereto. However, as the total angular displacement θ of the digital camera 1 becomes greater, vertical fluctuation of the digital camera 1 tends to increase due to human body characteristics. Therefore, it is preferable to change the determination criterion so that the acceptable range becomes wider, i.e., laxer.

In the above, the functional configuration of the digital camera 1 according to the present invention has been described with reference to FIGS. 2 to 6.

In the following, a description will be given of image capture processing carried out by the digital camera 1 having this type of functional configuration, with reference to FIG. 7.

Figure 7:
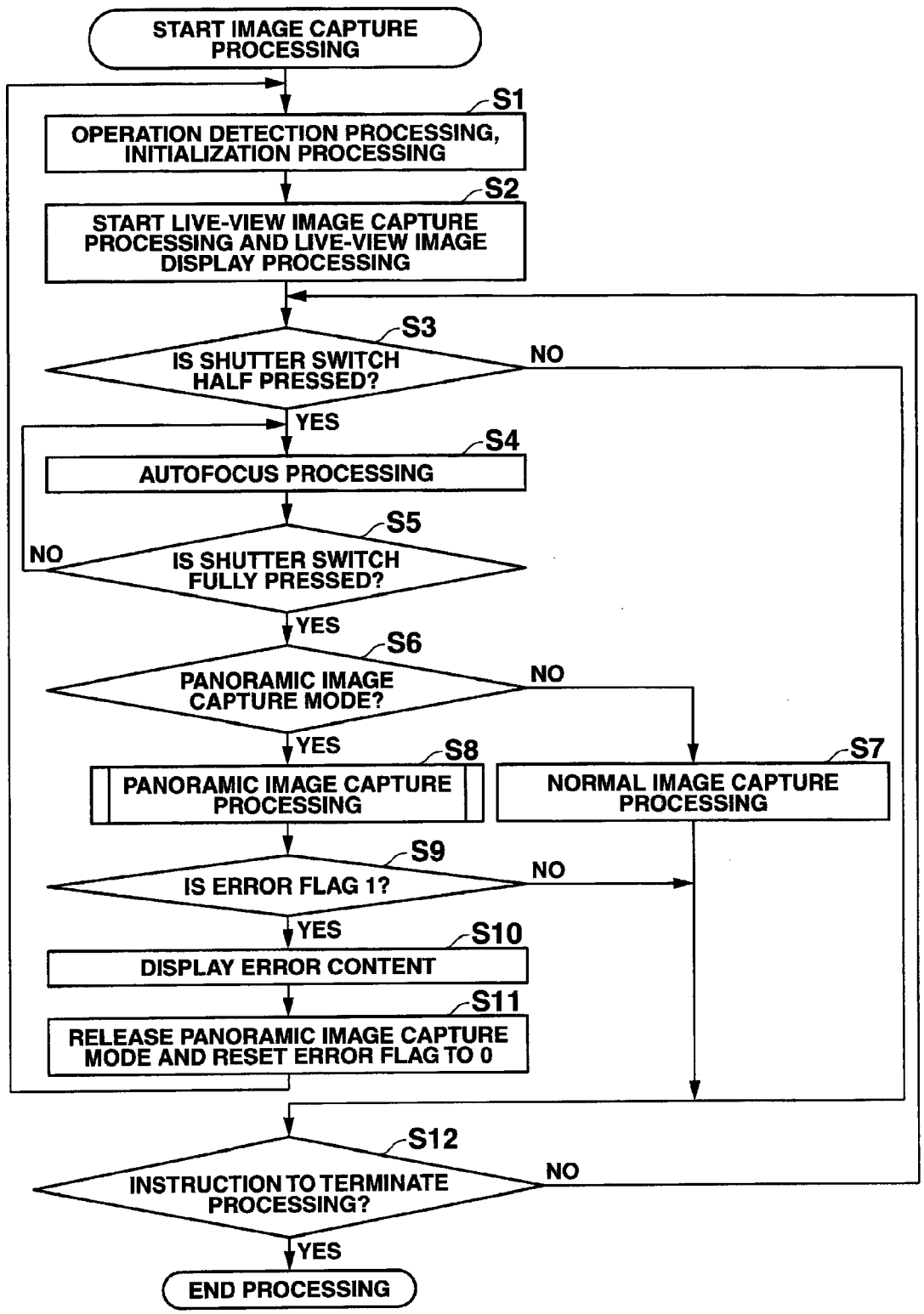
FIG. 7 is a flowchart showing one example of flow of image capture processing carried out by the digital camera shown in FIG. 2.

FIG. 7 is a flowchart showing one example of flow of the image capture processing.

In the present embodiment, the image capture processing starts when the power supply (not shown) of the digital camera 1 is turned on.

In step S1, the image capture control unit 51 shown in FIG. 2 carries out operation detection processing and initialization processing.

The operation detection processing is intended to mean processing of detecting the state of each switch of the operation unit 20. The image capture control unit 51 can detect whether the normal image capture mode or the panoramic image capture mode is set as the operation mode, by carrying out the operation detection processing.

In the present embodiment, the initialization processing includes processing of setting a constant value of angular displacement and a threshold value (e.g., 360 degrees) as an upper limit of angular displacement.

More specifically, the constant value of angular displacement and the threshold value (e.g., 360 degrees) as an upper limit of angular displacement are stored in advance in the ROM 12 of FIG. 1. Settings thereof are carried out by reading from the ROM 12 and writing into the RAM 13 those values. The constant value of angular displacement is for use in the determination process of step S35 of FIG. 8, which will be described later. On the other hand, the threshold value (e.g., 360 degrees) as an upper limit of angular displacement is for use in the determination process of step S43 of FIG. 8.

Furthermore, in the present embodiment, angular displacement detected by the angular velocity sensor 22 is accumulatively added as shown in steps S34, S38, and the like of FIG. 8, which will be described later. As a result of accumulation thereof, cumulative angular displacement and total angular displacement are stored in the RAM 13. The difference between the cumulative angular displacement and the total angular displacement will be described later. Therefore, processes of resetting the cumulative angular displacement and the total angular displacement to 0 are included in the initialization processing in the present embodiment. The cumulative angular displacement is compared with the above-described constant value in the determination process of step S35 of FIG. 8, which will be described later. On the other hand, the total angular displacement is compared with the above-described threshold value in the determination process of step S43 of FIG. 8, which will be described later.

Furthermore, the initialization processing in the present embodiment includes a process of resetting an error flag to 0. The error flag is intended to mean a flag that is set to 1 when an error occurs during the panoramic image capture processing (see step S45 of FIG. 9, which will be described later).

In step S2, the image capture control unit 51 starts live-view image capture processing and live-view image display processing.

The image capture control unit 51 controls the image capturing unit 16 and the image processing unit 17 to continue image capture operation by the image capturing unit 16. While the image capture operation is being continued, the image capture control unit 51 temporarily stores in a memory (the storing unit 18 in the present embodiment) image data of frames sequentially outputted from the image processing unit 17 via the image capturing unit 16. Such a series of control processing by the image capture control unit 51 is what is referred to as "live-view image capture processing".

Also, the image capture control unit 51 controls a display control unit (not shown) to sequentially read image data temporarily stored in the memory (the storing unit 18 in the present embodiment) at the time of live-view image capturing and to sequentially display frame images corresponding to respective pieces of the image data on the display unit 19. Such a series of control processing by the image capture control unit 51 is what is referred to as "live-view image display processing". Hereinafter, the frame image displayed on the display unit 19 by the live-view image display processing is referred to as a "live-view image".

Thus, live-view images are displayed on the display unit 19. In the present embodiment, it is assumed that live-view images are continuously displayed on the display unit 19 until the end of normal image capture processing of step S7 or the panoramic image capture processing of step S8, which will be described later.

In step S3, the image capture control unit 51 determines whether or not the shutter switch 41 is half pressed.

Here, "half press" refers to operation to press the shutter switch 41 of the operation unit 20 halfway down. Hereinafter, such an operation is referred to as "half press operation" as appropriate.

If the shutter switch 41 is not half pressed, NO is determined in step S3, and control proceeds to step S12.

In step S12, the image capture control unit 51 determines whether or not an instruction has been given to terminate the processing.

In the present embodiment, although there is no particular limitation, it is assumed that, as the instruction to terminate the processing, a notification is used which indicates that the power supply (not shown) of the digital camera 1 has been turned off.

Therefore, in the present embodiment, when the image capture control unit 51 is notified that the power supply has been turned off, a determination of YES is made in step S12, and the entire image capture processing ends.

On the other hand, when the power supply is on, since a power off state has not been notified, NO is determined in step S12, control goes back to step S2, and the processes thereafter are repeated. This means that, in the present embodiment, as long as the power is on, the loop processing from steps S3: NO, to S12: NO, is repeated until the shutter switch 41 is half pressed, and the image capture processing enters into a waiting state.

During such a waiting state, when the shutter switch 41 is half pressed, YES is determined in step S2, and control proceeds to step S3.

In step S4, the image capture control unit 51 controls the image capturing unit 16 to execute what is called AF (Auto Focus) processing.

In step S5, the image capture control unit 51 determines whether or not the shutter switch 41 is fully pressed.

If the shutter switch 41 is not fully pressed, NO is determined in step S5. In this case, control goes back to step S4, and processes thereafter are repeated. In the present embodiment, until the shutter switch 41 is fully pressed, the loop processing of steps S4 and S5: NO is repeated, and the AF processing is executed for each time.

After that, when the shutter switch 41 is fully pressed, YES is determined in step S5, and control proceeds to step S6.

In step S6, the image capture control unit 51 determines whether or not the operation mode currently set is the panoramic image capture mode.

If the panoramic image capture mode is not currently set, i.e., normal image capture mode is currently set, NO is determined in step S6, and control proceeds to step S7.

In step S7, the image capture control unit 51 executes the normal image capture processing as described above.

This means that image data of one frame outputted from the image processing unit 17 immediately after the full press operation is stored in the removable media 31 as a recording target. With this, the normal image capture processing of step S7 ends, and control proceeds to step S12. Since the processes of steps S12 and after are already described in the above, a description thereof is omitted here.

On the other hand, if the panoramic image capture mode is currently set, YES is determined in step S6, and control proceeds to step S8.

In step S8, the image capture control unit 51 executes the panoramic image capture processing as described above.

The detailed description of the panoramic image capture processing will be given later with reference to FIGS. 8 and 9. Basically, image data of a panoramic image is generated and stored in the removable media 31 as a recording target. With this, the panoramic image capture processing of step S8 ends, and control proceeds to step S9.

In step S9, the image capture control unit 51 determines whether or not the error flag is set to 1.

While a detailed description will be given later with reference to FIGS. 8 and 9, if the image data of the panoramic image is stored in the removable media 31 as a recording target and thereby the panoramic image capture processing of step S8 properly ends, the error flag is set to 0. In such a case, NO is determined in step S9, and control proceeds to step S12. Since the processes of steps S12 and after have been already described in the above, a description thereof is omitted here.

On the other hand, if some error has occurred during the panoramic image capture processing of step S8, the panoramic image capture processing ends improperly. In such a case, the error flag is set to 1, YES is determined in step S9, and control proceeds to step S10.

In step S10, the image capture control unit 51 displays the error content on the display unit 19. Specific examples of the error content to be displayed will be described later.

In step S11, the image capture control unit 51 releases the panoramic image capture mode and resets the error flag to 0.

After that, control goes back to step S1, and processes thereafter are repeated. This means that the image capture control unit 51 waits for another image capture operation by the user.

In the above, a description has been given of flow of the image capture processing with reference to FIG. 7.

In the following, a description will be given of detailed flow of the panoramic image capture processing of step S9 from the image capture processing shown in FIG. 7, with reference to FIGS. 8 and 9.

Figure 8:
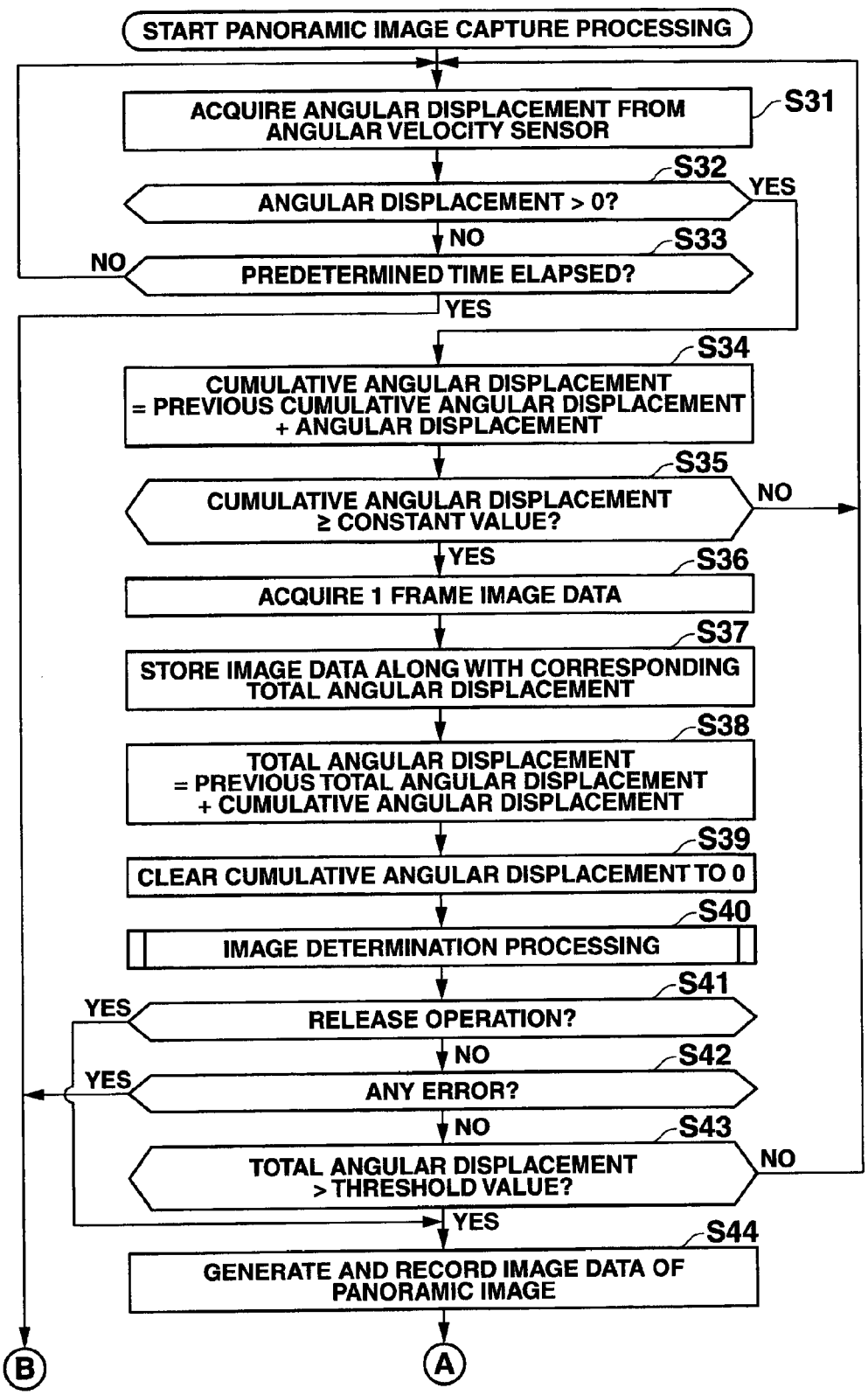
FIG. 8 is a flowchart showing a detailed flow of panoramic image capture processing from the image capture processing shown in FIG. 7.
Figure 9:
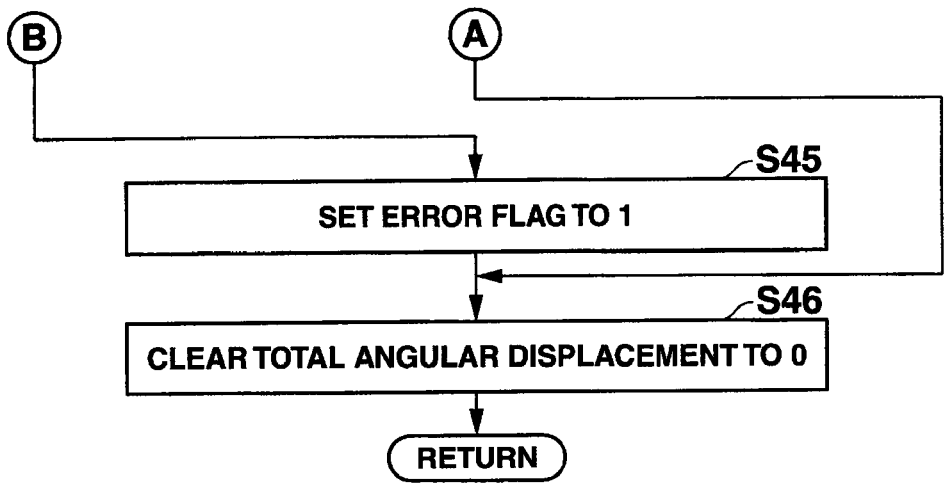
FIG. 9 is a flowchart showing a detailed flow of panoramic image capture processing from the image capture processing shown in FIG. 7.

FIGS. 8 and 9 are flowcharts showing detailed flow of the panoramic image capture processing.

As described above, when the shutter switch 41 is fully pressed in the panoramic image capture mode, YES is determined in steps S5 and S6 of FIG. 7, control proceeds to step S8, and the following processing is executed as the panoramic image capture processing.

This means that, in step S31 of FIG. 8, the image capture control unit 51 acquires angular displacement from the angular velocity sensor 22.

In step S32, the image capture control unit 51 determines whether or not the angular displacement acquired in the process of step S31 is greater than 0.

If the user does not move the digital camera 1, since the angular displacement is 0, NO is determined in step S32, and control proceeds to step S33.

In step S33, the image capture control unit 51 determines whether or not a predetermined time period for which the angular displacement continues to be 0 has elapsed. As the predetermined time period, for example, a time period can be employed that is appropriately longer than a time period necessary for the user to start to move the digital camera 1 after the full press of the shutter switch 41.

If the predetermined time period has not elapsed, NO is determined in step S33, control goes back to step S31, and the processes thereafter are repeated. As long as the duration of a state in which the user does not move the digital camera 1 does not exceed the predetermined time, the image capture control unit 51 repeats the loop processing from steps S31 to S33: NO, and thereby the panoramic image capture processing enters into a waiting state.

In such a waiting state, if the user moves the digital camera 1, the angular displacement supplied from the angular velocity sensor 22 becomes greater than 0. In such a case, a determination of YES is made in step S32, and control proceeds to step S34.

In step S34, the image capture control unit 51 updates the cumulative angular displacement by adding the angular displacement acquired in the process of step S31 to the previous cumulative angular displacement (cumulative angular displacement=previous cumulative angular displacement+angular displacement). In this way, the value stored in the RAM 13 as the cumulative angular displacement is updated.

The cumulative angular displacement is intended to mean such an accumulated value of the angular displacement and indicates the moving amount of the digital camera 1.

Here, in the present embodiment, each time the user moves the digital camera 1 by a predetermined amount, it is assumed that image data of one frame (composition target) for generation of a panoramic image in progress is supplied from the image processing unit 17 to the image composition unit 52.

For this purpose, a cumulative angular displacement corresponding to the "predetermined amount" as a moving amount of the digital camera 1 has been given in advance as the "constant value" in the initialization processing of step S1 of FIG. 7.

In the present embodiment, each time the cumulative angular displacement reaches the constant value, image data of one frame (composition target) is supplied from the image processing unit 17 to the image composition unit 52, and the cumulative angular displacement is reset to be 0.

Such a series of processing is carried out as processes of a subsequent step S35 and thereafter.

In step S35, the image capture control unit 51 determines whether or not the cumulative angular displacement has reached the constant value.

If the cumulative angular displacement has not yet reached the constant value, a determination of NO is made in step S35, control goes back to step S31, and processes thereafter are repeated. This means that until the cumulative angular displacement has reached the constant value due to the fact that the user has moved the digital camera 1 by the predetermined amount, the image capture control unit 51 repeats the loop processing from steps S31 to S35.

After that, when the cumulative angular displacement has reached the constant value due to the fact that the user has moved the digital camera 1 by the predetermined amount, a determination of YES is made in step S35, and control proceeds to step S36.

In step S36, the image composition unit 52 acquires image data of one frame from the image processing unit 17 under control of the image capture control unit 51.

This means that after control proceeds to step S36 due to the fact that the cumulative angular displacement has reached the constant value, the image capture control unit 51 issues an acquisition instruction to the image composition unit 52.

Upon receiving the acquisition instruction, the image composition unit 52 acquires image data of one frame from the image processing unit 17, as the process of step S36.

In step S37, the image capture control unit 51 stores the image data of one frame acquired in the process of step S36 along with the corresponding total angular displacement in association with each other.

In step S38, the image capture control unit 51 updates the total angular displacement by adding the current cumulative angular displacement, which is approximately equal to the constant value, to the previous total angular displacement (total angular displacement=previous total angular displacement+cumulative angular displacement). In this way, the value stored in the RAM 13 as the total angular displacement is updated.

In step S39, the image capture control unit 51 resets the cumulative angular displacement to 0. This means that the value stored in the RAM 13 as the cumulative angular displacement is updated to 0.

In this way, the cumulative angular displacement is used for controlling the timing of the image data of one frame (composition target) being supplied from the image processing unit 17 to the image composition unit 52, i.e., the timing of issuing the acquisition instruction. For this purpose, the cumulative angular displacement is reset to 0 each time the constant value is reached and the acquisition instruction is issued.

Accordingly, even if the cumulative angular displacement is used, the image capture control unit 51 cannot recognize up to which position the digital camera 1 has moved from the panoramic image capture processing starting up until the present.

In order to make it possible for the image capture control unit 51 to recognize up to which position the digital camera 1 has moved, in the present embodiment, the total angular displacement is employed in addition to the cumulative angular displacement.

The total angular displacement is an accumulated value of the angular displacement, but is not reset to 0 even if the cumulative angular displacement has exceeded the predetermined amount, and is always accumulatively added until the panoramic image capture processing ends (more precisely, until the process of step S46, which will be described later, is executed).

After the total angular displacement is updated in the process of step S38 and the cumulative angular displacement is reset to 0 in the process of step S39, control proceeds to step S40.

In step S40, the image determination unit 53 executes image determination processing of determining validity of the image data of the frame acquired in the process of step S36.

A detailed description of the image determination processing will be given later with reference to FIG. 10. After the validity of the image data of the frame acquired in the process of step S36 is determined, control proceeds to step S41.

In step S41, the image capture control unit 51 determines whether or not a release operation has been performed.

If no release operation has been performed, i.e., if the shutter switch 41 is still fully pressed by the user, NO is determined in step S41, and control proceeds to step S42.

In step S42, the image capture control unit 51 determines whether or not any error has occurred in image capturing.

Although there is no particular limitation regarding error in image capturing, in the present embodiment, an error in image capturing is used in which, for example, a determination made in the image determination processing of step S40 that the image data of the frame acquired in the process of step S36 is determined to be invalid.

If the image data of the frame acquired in the process of step S36 is determined to be valid in the image determination processing of step S40 and no other errors have occurred in image acquiring, NO is determined in step S42, and control proceeds to step S43.

In step S43, the image capture control unit 51 determines whether or not the total angular displacement has exceeded the threshold value.

As described above, the total angular displacement is intended to mean an accumulated value of angular displacement from the start of the panoramic image capture processing (when a full press operation has been performed) until the point in time when the process of step S38 is executed.

In the present embodiment, the maximum possible amount by which the user can move the digital camera 1 during the panoramic image capturing is predetermined. The total angular displacement corresponding to the "maximum moving amount" as a moving amount of the digital camera 1 has been given in advance as the "threshold value" in the initialization processing of step S1 of FIG. 7.

This means that in the present embodiment the fact that the total angular displacement has reached the threshold value means that the digital camera 1 has moved by the maximum moving amount.

Therefore, if the total angular displacement has not reached the threshold value, i.e., the moving amount of the digital camera 1 has not reached the maximum moving amount, the user can still continue to move the digital camera 1. In this case, a determination of NO is made in step S43, control goes back to step S31, and processes thereafter are repeated.

Assuming that a state in which the time period for which the angular displacement continues to be zero reaches a predetermined time period (the digital camera 1 has not moved for the predetermined time period) is included as one error in image capturing, as long as the full press operation continues in a state in which no error has occurred, the loop processing from steps S31 to S43 is repeated.

After that, in a state in which no error has occurred, if a release operation is performed (i.e., YES is determined in the process of step S41) or if the digital camera 1 has moved beyond the maximum moving amount (i.e., YES is determined in the process of step S43), then control proceeds to step S44.

In step S44, the image capture control unit 51 generates image data of a panoramic image via the image composition unit 52, and stores it in the removable media 31 as image data of a recording target.

In step S46 of FIG. 9, the image capture control unit 51 resets the total angular displacement to 0.

With this, the panoramic image capture processing properly ends. This means that the process of step S8 of FIG. 7 properly ends, and NO is determined in the process of the next step S9. Since the processes after a determination of NO is made in step S9 have been already described above, a description thereof is omitted here.

During the series of processes described above, if some error occurs, i.e., if YES is determined in the process of step S33 of FIG. 8, or if YES is determined in the process of step S42, then control proceeds to step S45 of FIG. 9.

For example, if the image data of the frame acquired in the process of step S36 is determined to be invalid in the image determination processing of step S40, YES is determined in the process of step S42, and control proceeds to step S45.

In step S45, the image capture control unit 51 sets the error flag to 1.

In this case, the process of step S44 is not executed, i.e., no image data of any panoramic image is recorded, and the panoramic image capture processing improperly ends.

This means that the process of step S8 of FIG. 7 improperly ends, YES is determined in the process of the next step S9, and error content is displayed in the process of step S10.

Although there is no particular limitation regarding error content in this case as described above, a message can be employed such as "image capture failed" or "over the time limit", for example.

In the above, a detailed flow of the panoramic image capture processing has been described with reference to FIGS. 8 and 9.

In the following, a description will be given of detailed flow of the image determination processing of step S40 from the panoramic image capture processing with reference to FIG. 10.

Figure 10:
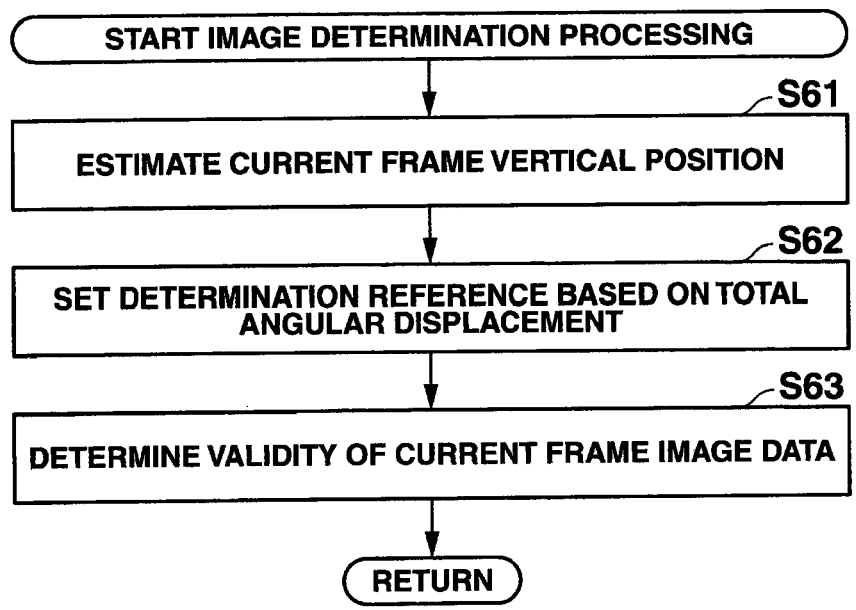
FIG. 10 is a flowchart showing a detailed flow of image determination processing from the panoramic image capture processing shown in FIG. 8.

FIG. 10 is a flowchart showing detailed flow of the image determination processing.

As described above, when the shutter switch 41 is fully pressed in the panoramic image capture mode, YES is determined in steps S5 and S6 of FIG. 7, control proceeds to step S8, and the following processing is executed as a part of the panoramic image capture processing.

In step S61 of FIG. 10, the image determination unit 53 estimates a vertical position of a frame (hereinafter, referred to as a "determination target frame") corresponding to the image data previously stored in the process of step S37 of FIG. 8.

Here, the method of estimating the vertical position is not limited. For example, a method that estimates based on angular displacement in a vertical direction provided from the angular velocity sensor 22 can be employed, or a method that estimates based on comparison result between the determination target frame and the previously acquired frame can be employed.

In step S62, the image determination unit 53 sets a determination criterion based on the total angular displacement θ previously computed in the process of step S38 of FIG. 8.

In step S63, the image determination unit 53 determines validity of the image data of the determination target frame using the determination criterion set in the process of step S62.

As described above, in the image determination processing in the example of FIG. 10, each time image data of a frame is acquired (for each determination target frame), validity of the image data of the determination target frame is determined by using a determination criterion that is set based on the current total angular displacement θ. Therefore, the image data of the determination target frame is more frequently determined to be valid even if there has been vertical fluctuation, which is inevitably caused by human body characteristics.

Thus, when the image data of the determination target frame is determined to be valid in the processes of steps S61 to S63, the image determination processing ends. That is, the process of step S40 of FIG. 8 ends, and control proceeds to step S41. Since the processes of steps S41 and after have been already described above, description thereof is omitted here.

As described above, the digital camera 1 of the present embodiment is provided with an image capturing unit 16, which sequentially outputs each piece of image data sequentially acquired by image capturing at a predetermined time interval as image data of a frame.

The digital camera 1 of the present embodiment is also provided with an image composition unit 52 and an image determination unit 53.

The image composition unit 52 acquires image data of a frame outputted from the image capturing unit 16 each time the digital camera 1 moves by a predetermined amount (each time cumulative angular displacement reaches a constant value), and stores it in the storing unit 18 or the like. Furthermore, the image composition unit 52 combines at least a part of the image data of a plurality of frames that have been cumulatively stored, and thereby generates image data of a composite image.

The image determination unit 53 determines, each time image data of a new frame is acquired by the image composition unit 52, whether or not the new frame is valid as a composition target.

Here, the image determination unit 53 sets a determination criterion according to a moving amount (the total angular displacement θ, in the present embodiment) of the image capturing apparatus from the start of the panoramic image capturing up to the time when the image data of the new frame is acquired.

With this, it becomes possible to determine the validity of the image data of a frame giving consideration to vertical fluctuations inevitably caused by human body characteristics. Fluctuations in a vertical position of the digital camera 1 tend to increase as the total angular displacement θ becomes greater due to human body characteristics. In such a case, it becomes possible to determine the image data of a new frame to be not invalid but valid, if the new frame includes a vertical fluctuation, which is inevitably caused by human body characteristics. As a result, it becomes possible to carry out panoramic image capturing through to the end without causing unnecessary errors.

Thus, it becomes possible to enhance success rate in panoramic image capturing.

It should be noted that the present invention is not limited to the embodiment described above, and any modifications and improvements thereto within a scope in which an object of the present invention can be realized are included in the present invention.

For example, in the embodiment described above, a determination criterion was set based on the total angular displacement θ, but the setting method is not limited to this.

For example, it is possible to employ a setting method that variably sets a determination criterion in accordance with the moving amount of the digital camera 1 from the point in time when the previous determination was made by the image determination unit 53 until image data of the new frame is acquired.

Furthermore, in the embodiment described above, in order to determine the validity of the image data of a new frame, the image determination unit 53 uses the image data of the entire new frame for determination. But the present invention is not limited to this.

For example, in order to generate image data of a panoramic image, the image composition unit 52 can cut composition target frames into partial areas thereof, and combine the partial areas of respective frames. In such a case, the image determination unit 53 may determine validity of a new frame using only a partial area of the new frame after being cut.

If the same determination criterion is employed for determination of validity of the new frame, determination using the partial area of the new frame is less strict than determination using the entire frame.

In this way, occurrence of unnecessary errors can be avoided, and it becomes possible to carry out panoramic image capturing through to the end.

Accordingly, it is possible to enhance the success rate of panoramic image capturing.

The partial area to be used for determination of validity of a new frame is not limited to a partial area of the new frame to be cut for composition, but any area of the new frame may be applicable.

Furthermore, the embodiment described above is configured to detect angular displacement of the digital camera 1 by way of the angular velocity sensor 22. However, methods of detecting angular displacement are not limited to this.

For example, it is possible to employ a method that detects the angular displacement of the digital camera 1 by way of image processing of analyzing live-view images and detecting angular displacement between the images.

Furthermore, in the embodiment described above, though it has been assumed that a panoramic image in progress and a panoramic image are landscape (horizontally) oriented, the present invention is not limited to this. A panoramic image or a panoramic image in progress may be generated in the form of a shape elongated in a moving direction of the digital camera 1, for example, a portrait (vertically oriented) configuration.

Furthermore, a description has been given in the embodiment in which the image capturing apparatus according to the present invention is configured by the digital camera 1.

However, the present invention is not limited to this and can be applied to any electronic device that is provided with an image capturing function to enable panoramic image capturing. For example, the present invention can be widely applied, to a portable personal computer, a portable navigation device, a portable game device, and the like.

The series of processes described above can be executed by hardware and also can be executed by software.

In a case in which the series of processes are to be executed by software, a program configuring the software is installed from a network or a storage medium into an image capturing apparatus, a computer that controls the image capturing apparatus, or the like. The computer may be a computer embedded in dedicated hardware. Alternatively, the computer may be capable of executing various functions by installing various programs, i.e., a general-purpose personal computer, for example.

The storage medium containing the program can be constituted not only by the removable media 31 distributed separately from the device main body for supplying the program to a user, but also can be constituted by a storage medium or the like supplied to the user in a state incorporated in the device main body in advance. The removable media 31 is composed of a magnetic disk (including a floppy disk), an optical disk, a magnetic optical disk, or the like, for example. The storage medium, supplied to the user in a state in which it is incorporated in the device main body in advance, may include the ROM 12 in which the program is stored, a hard disk included in the storing unit 18, and the like, for example.

It should be noted that in the present specification the steps describing the program stored in the storage medium include not only the processing executed in a time series following this order, but also processing executed in parallel or individually, which is not necessarily executed in a time series.

What is claimed is:

1. An image capturing apparatus, comprising:
an image capturing device; and
a controller which is configured to function as:
an acquiring unit that acquires a displacement amount by which the image capturing apparatus moves in a predetermined direction when image data is captured by the image capturing device at predetermined time intervals;
a determination criterion setting unit that sets a determination criterion for determining whether the captured image data is to be combined or not;
a change unit that changes a level of the determination criterion in accordance with a total displacement amount of the image capturing apparatus acquired by the acquiring unit from a time when a first piece of image data is captured by the image capturing device;
an image determination unit that determines whether or not the captured image data is valid as a composition target based on the determination criterion with the changed level; and
an image composition unit that combines image data determined by the image determination unit as being valid as a composition target,
wherein the change unit changes the level of the determination criterion from a first level which is set when the total displacement amount of the image capturing apparatus is within a first range of the displacement amount, to a second level which is more relaxed than the first level and which is set when the total displacement amount of the image capturing apparatus exceeds the first range to be within a second range of the displacement amount that is greater than the first range.

2. The image capturing apparatus as set forth in claim 1, wherein the controller is configured to further function as a stop control unit that performs control to stop combining image data by the image composition unit when the image determination unit determines that the image data captured is not valid.

3. The image capturing apparatus as set forth in claim 1, wherein the image determination unit determines whether or not the image data is valid as a composition target using a partial area of the image data captured at predetermined time intervals.

4. The image capturing apparatus as set forth in claim 1, further comprising an angular displacement detecting device that detects an angular displacement of the image capturing apparatus,
wherein the acquiring unit acquires an angular displacement detected by the angular displacement detecting device, as the displacement amount.

5. The image capturing apparatus as set forth in claim 1, wherein the determination criterion is a criterion for determining whether a vertical position of the image data is within a predetermined range, a direction of the vertical position being substantially orthogonal to the predetermined direction.

6. An image capturing method carried out by an image capturing apparatus which comprises an image capturing device, the image capturing method comprising:
acquiring a displacement amount by which the image capturing apparatus moves in a predetermined direction when image data is captured by the image capturing device at predetermined time intervals;
setting a determination criterion for determining whether the captured image data is to be combined or not;
changing a level of the determination criterion in accordance with a total displacement amount of the image capturing apparatus acquired by the acquiring unit from a time when a first piece of image data is captured by the image capturing device;
determining whether or not the captured image data is valid as a composition target based on the determination criterion with the changed level; and
combining image data determined as being valid as a composition target,
wherein the level of the determination criterion is changed from a first level which is set when the total displacement amount of the image capturing apparatus is within a first range of the displacement amount, to a second level which is more relaxed than the first level and which is set when the total displacement amount of the image capturing apparatus exceeds the first range to be within a second range of the displacement amount that is greater than the first range.

7. A non-transitory computer-readable storage medium having stored thereon a program that is executable by a computer of an image capturing apparatus which comprises an image capturing device, the program being executable by the computer to make the computer function as units comprising:

an acquiring unit that acquires a displacement amount by which the image capturing apparatus moves in a predetermined direction when image data is captured by the image capturing device at predetermined time intervals;

a determination criterion setting unit that sets a determination criterion for determining whether the captured image data is to be combined or not;

a change unit that changes a level of the determination criterion in accordance with a total displacement amount of the image capturing apparatus acquired by the acquiring unit from a time when a first piece of image data is captured by the image capturing device;

an image determination unit that determines whether or not the captured image data is valid as a composition target based on the determination criterion with the changed level; and an image composition unit that combines image data determined by the image determination unit as being valid as a composition target, wherein the change unit changes the level of the determination criterion from a first level which is set when the total displacement amount of the image capturing apparatus is within a first range of the displacement amount, to a second level which is more relaxed than the first level and which is set when the total displacement amount of the image capturing apparatus exceeds the first range to be within a second range of the displacement amount that is greater than the first range.

* * * * *